May 19, 1970  R. MANCEL  3,512,790
SEALING DEVICES FOR ROTATING PARTS
Filed May 23, 1967
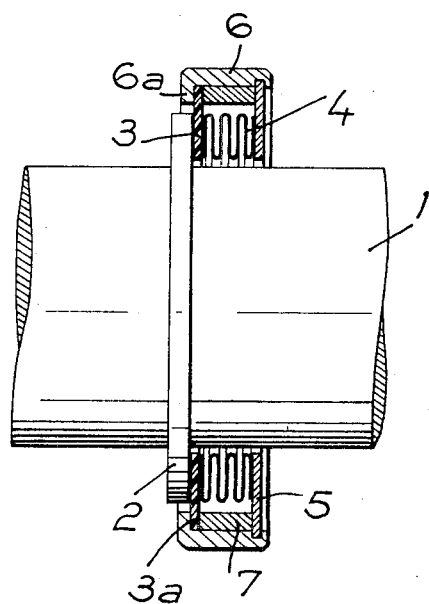
INVENTOR
RAYMOND MANCEL
BY
Bacon & Thomas
ATTORNEYS

United States Patent Office 3,512,790
Patented May 19, 1970

---

3,512,790
SEALING DEVICES FOR ROTATING PARTS
Raymond Mancel, Paris, France, assignor to Societe d'Adaptations Industrielles et Commerciales des Matieres Plastiques Saimap, Paris, France, Societe Anonyme Organised under the law of France
Filed May 23, 1967, Ser. No. 640,738
Claims priority, application France, June 1, 1966, 63,760
Int. Cl. F16j *9/00, 15/34*
U.S. Cl. 277—42                                3 Claims

ABSTRACT OF THE DISCLOSURE

A sealing device for a rotating shaft having a flange formed thereon, constituted by a fixed annular sealing element of graphite or metal fabric impregnated with "Teflon" applied against the flange of the shaft by a resilient bellows, the annular sealing element being in direct contact, at its periphery, with a metal casing surrounding the sealing device.

---

The present invention relates to sealing devices, and particularly to such devices for preventing fluid flow between two parts movable one with respect to the other, of which one is for example a rotating shaft.

The most important characteristics of a sealing joint subjected to dynamic forces are its durability, that is to say it should have a long life associated with small wear during prolonged periods of operation, and its sealing capabilities at high speeds of rotation, whatever may be the vibrations to which it is subjected when it is necessary to use the device in rapidly turning machines.

Sealing devices are already known which cooperate with a rotating shaft having a flange coming into contact with a fixed annular sealing element which bears, by means of a resilient metal bellows, against a fixed abutment coaxial with the turning shaft. Generally, the annular sealing element does not provide a good resistance to wear, notably because of the difficulty of dissipating the frictional heat accumulated in the sealing device.

The present invention aims at minimising this disadvantage, and with this in view, has for an object to provide a sealing device for a turning shaft having high resistance to wear and being capable of rapid dissipation of frictional heat thereby enabling the shaft to rotate at high speeds and under heavy loads.

The sealing device of the invention consists in a sealing device particularly for rotating packs of the type cooperating with a turning shaft provided with a flange, and having a fixed annular sealing element maintained against the flange by means of a resilient metal bellows, wherein the annular sealing element is constituted by a graphite or metal fabric impregnated with polytetrafluoroethylene "Teflon," and is in direct intimate contact at its periphery with a metal casing containing the sealing device and forming an abutment for the bellows.

Other characteristics and advantages of the invention will appear from the following description of one embodiment of the sealing device, given by way of example, with reference to the accompanying drawings in which:

The single figure shows, in longitudinal section a sealing device according to the invention.

In this single figure, the turning shaft is represented at 1. The shaft 1 carries a flange or shoulder 2 constituted by a part integral with the shaft 1 or rigidly fixed to the latter. One of the faces of the flange 2 bears against an annular sealing element 3 constituted, in accordance with the invention, by a graphite or metal fabric impregnated with polytetrafluoroethylene, "Teflon." The inner diameter of the element 3 is slightly greater than the diameter of the shaft 1. The sealing element 3 is maintained against the flange 2 by means of a resilient metal bellows 4 which also bears against a thrust face constituted by a metal washer 5 coaxial with the shaft 1 and rigidly secured to a metal casing 6 fixed in a corresponding housing in the frame of a machine for example.

The metal casing 6 has one of its extremities 6a turned downwardly towards the interior to form a radial shoulder and, in accordance with the invention, enclosing at least one metal distance piece 7 which bears also against the internal face of the metal washer 5 and the peripheral portion 3a of the sealing elements 3.

The space defined by the bellows 4, the sealing element 3, the distance piece 7 and the washer 5 contains a fluid under pressure and is either hermetically sealed or connected to a source of fluid under pressure. The sealing assembly can thus function either in such a manner as to balance the pressure prevailing on the face of the sealing element opposed to the bellows, the pressure at the interior of the bellows being then equal to this pressure and the sealing device being subjected only to the pressure of the turning shaft on the sealing element, or in such a way as to control at will the resultant pressure (the pressure prevailing on the face of the sealing element opposed to the bellows, plus the pressure of the turning shaft on the sealing element, minus the pressure within the bellows) on the sealing device by fixing a value for this pressure.

This self-lubricating sealing device is adapted to withstand heavy loads and high speeds of rotation without deterioration or substantial wear of the sealing element 3 impregnated with polytetrafluoroethylene, "Teflon," the frictional heat being readily dissipated by the periphery 3a of the sealing element in intimate contact with the metal casing 6 and the metal distance piece 7. Thus, the metal bellows is not exposed to high temperatures and therefore retains, substantially constant, its resilient characteristic.

Of course, the present invention is not limited to the embodiment shown and described in detail, since various modifications can be made thereto without departing from the scope of the invention.

What I claim is:

1. A sealing device particularly of the type for cooperating with a flange rigid with a turning shaft, said sealing device comprising: a rigid, annular metal casing having a rigid end wall extending radially inwardly thereof; an annular sealing element having high resistance to wear and being capable of rapid dissipation of frictional heat forming the other end wall of the casing of the sealing device and extending radially inwardly from the annular metal casing; said sealing element comprising a graphite or metal fabric impregnated with polytetrafluoroethylene having an outer, radially extending surface to be applied against the shaft flange for providing therebetween a seal, the peripheral portion of said sealing element being fixed to said metal casing and in direct, intimate heat exchange contact therewith; and a resilient, axially expanding, annular, metal bellows spaced radially inwardly of the peripheral portion of said annular metal casing, said metal bellows bearing at one end thereof against said rigid end wall of said casing and bearing at the other end thereof against the inner, radially extending surface of said sealing element in the area opposite to that engageable with the shaft flange.

2. A device according to claim 3 characterized in that the enclosure defined by the resilient metal bellows, the sealing element, the distance piece and the metal washer is sealed and contains a fluid under pressure.

3. A sealing device according to claim 1, wherein the metal casing includes a shoulder extending inwardly thereof at the end thereof opposite to said rigid end wall, said rigid end wall of said casing comprises a metal washer rigidly fixed at its periphery to said casing, an annular, metal distance piece is disposed concentric within the casing and spaced outwardly of said metal bellows, said distance piece bears at one end thereof against said metal washer, the other end of said distance piece is disposed in opposed, spaced relation to said shoulder, the peripheral portion of the sealing element is located between said shoulder and the other end of said distance piece, and the other end of said distance piece bears against the peripheral portion of said sealing element confining and fixedly securing the sealing element between said distance piece and said shoulder.

References Cited

UNITED STATES PATENTS

| | | | |
|---|---|---|---|
| 2,192,426 | 3/1940 | Ames | 277—88 |
| 2,691,814 | 10/1954 | Tait. | |
| 2,798,005 | 7/1957 | Love. | |
| 3,000,846 | 9/1961 | Runton et al. | 277—96 X |
| 3,033,623 | 5/1962 | Thomson. | |
| 3,124,363 | 3/1964 | Cieslik | 277—42 |
| 2,577,292 | 12/1951 | Weber | 277—88 |
| 2,279,669 | 4/1942 | Friskney | 277—40 |
| 3,108,018 | 10/1963 | Lewis | 117—161 |

FOREIGN PATENTS 716,409  10/1954  Great Britain.

SAMUEL ROTHBERG, Primary Examiner

U.S. Cl. X.R.

277—88, 96